Aug. 12, 1958     F. C. MARINO     2,847,646
DIODE TEST SET

Filed May 1, 1957                                            2 Sheets-Sheet 1

INVENTOR
F. C. MARINO
BY
ATTORNEY

Aug. 12, 1958  F. C. MARINO  2,847,646
DIODE TEST SET

Filed May 1, 1957  2 Sheets-Sheet 2

REVERSE CONDUCTION CHARACTERISTIC

A — 2 ma, .8 V.
B — 8 ma, 1.6 V.

$$\text{SLOPE RESISTANCE} = \frac{\Delta E_{REVERSE}}{\Delta I_{REVERSE}}$$

$$\text{,, ,,} = \frac{1.6 - 0.8}{(8-2) \times 10^{-3}}$$

,, ,, = 133 OHMS

ADDED RESISTANCE:

RESISTOR 20 = 5

DIRECT POTENTIAL
SOURCE RESISTANCE = 75

TOTAL = 80  −80

DIODE REVERSE
DYNAMIC RESISTANCE = 53 OHMS

INVENTOR
F. C. MARINO
BY Patrick J. Roche
ATTORNEY

United States Patent Office 2,847,646
Patented Aug. 12, 1958

2,847,646

DIODE TEST SET

Frank C. Marino, Montclair, N. J., assignor to Bell Telephone Laboratories, Incorporated, New York, N. Y., a corporation of New York Application May 1, 1957, Serial No. 656,301

10 Claims. (Cl. 324—158)

This invention relates to apparatus for displaying preselected portions of the current-voltage characteristics of an impedance device on a cathode ray oscilloscope screen. More particularly, this invention relates to such apparatus for use in connection with semiconductor junction diodes which conduct in one direction when biased in that direction by a small bias voltage and which conduct in the opposite direction when biased in such opposite direction by a large bias voltage.

The United States Patent No. 2,669,004, which issued February 16, 1954, to R. R. Blair discloses apparatus for displaying the complete current-voltage characteristic of a varistor on a cathode ray oscilloscope screen. The varistor is an impedance device which can conduct in either direction in response to relatively small bias voltages applied in either direction and in which changes in voltage produce changes in current of comparable magnitude. The Blair apparatus comprises, briefly, switching means for alternately connecting different potential sources to bias the varistor for forward and reverse conduction, respectively. Both such sources energize a first branch circuit including the horizontal deflection circuits of the oscilloscope, and a second branch circuit including in series the varistor under test and a resistor. Associated switching devices are provided to connect appropriate resistors in the oscilloscope branch of the circuit to obtain the proper oscilloscope horizontal deflection sensitivity for displaying both the forward and the reverse conduction characteristics of the varistors.

However, a semiconductor junction diode has been manufactured which displays conduction characteristics which are substantially different from the characteristics of varistors and which include forward and reverse low impedance conduction regions which are separated by an intermediate high impedance region of substantially no conduction. The magnitude of the reverse bias which must be applied to the diode to cause conduction is generally substantially larger than the forward bias which must be applied to cause conduction. Such a diode, which is hereinafter referred to as a breakdown diode, is described in United States Patent No. 2,714,702, which issued August 2, 1955, to William Shockley. The reverse breakdown point in the characteristic of such a diode is so sharp that in the reverse breakdown region of the characteristic a small voltage change results in a precipitous change in current. The reverse breakdown is generally much more abrupt than the forward breakdown of such a diode or of other more conventional diodes.

Breakdown diodes have been found to be useful as switching devices which are operable at a predetermined critical voltage corresponding to the reverse breakdown point of the diode characteristic. However, before a diode can be employed as a switch in a practical circuit application the characteristics of the diode must be determined to facilitate circuit design and to eliminate defective diodes. For switching purposes, a defective diode would display, for example, a curved, noisy, or erratic breakdown. These defects tend to obscure the reverse breakdown point in the diode characteristic so that it is difficult to determine the breakdown voltage.

When using diode curve tracing apparatus which is currently available, such as that described in the above-identified Blair patent, the entire characteristic of a breakdown diode must be displayed. Since the reverse bias necessary for breakdown is generally substantially larger than the forward bias necessary for breakdown, a large sweep deflection sensitivity must be employed on the oscilloscope with the result that it is impossible to detect the above-enumerated diode breakdown defects.

It is a principal object of the invention to check automatically the forward and reverse current-voltage characteristics of semiconductor junction diodes.

It is another object to display on a single cathode ray oscilloscope screen discrete portions of the electric current conduction characteristic of an impedance device with a single oscilloscope sweep deflection sensitivity to detect faulty conduction characteristics of such a device.

It is a further object to display substantially simultaneously on a cathode ray oscilloscope screen both the forward and reverse conduction characteristic curves of a semiconductor junction diode with sufficient sensitivity to detect faulty breakdown characteristics.

These and other objects of this invention are attained in a representative embodiment thereof in which both the forward bias potential for a diode under test, and the cathode ray oscilloscope continuous horizontal sweep potential, are obtained from the same source of alternating potential. The peak amplitude of the output wave of such alternating potential source is sufficient to bias the diode into conduction in the forward direction but not sufficient to bias the diode into conduction in the reverse direction. The peak-to-peak amplitude of the alternating potential source output wave is just sufficient to sweep the cathode ray beam across the full width of the oscilloscope screen.

The diode is connected across the terminals of the alternating potential source in a series circuit which includes, in addition, a switching device operated in synchronism with the potential alternations of the alternating potential source and a current sensing resistor, the resistor also being connected across the input terminals of the oscilloscope vertical deflection circuit. A source of direct potential is connected to the switch terminals to be alternately and recurrently switched thereby into the series circuit in series-aiding relationship with a portion of the alternating potential source output wave which tends to reverse bias the diode. The magnitude of the direct potential source output voltage is at least sufficient, when so connected in series-aiding relationship with such portion of the alternating potential source output wave, to bias the diode into reverse conduction.

On operation, the alternating potential source output voltage continuously sweeps the oscilloscope beam back and forth across the screen in the horizontal direction while the breakdown diode is alternately biased into forward and reverse conduction. Potentials derived from the current sensing resistor during the diode intermittent forward and reverse conduction intervals deflect the oscilloscope beam in the vertical direction either up or down, respectively, to trace the predetermined portions of the diode conduction characteristic on the oscilloscope screen.

It is one feature of the above-recited connections that the direct potential source output voltage contributes to only the diode reverse bias potential and does not affect the horizontal sweeping of the electron beam in the cathode ray oscilloscope. In other words, the direct potential source serves, in effect, to reduce the diode reverse breakdown voltage point. Thus the diode under test, the synchronously operated switching device, and the source of direct potential are arranged to select only the desired portions of the diode characteristic so that these portions may be displayed on a single cathode ray oscilloscope screen with deflection sensitivities which are appropriate for the necessary minute examination of the diode characteristics.

It is a further feature of this invention that the display of the diode reverse conduction characteristic, when derived as described above, is suitable for use in determining the diode reverse dynamic resistance as will be hereinafter discussed in greater detail.

The above described features and objects of this invention, as well as the arrangement and operation of the invention, will be more readily understood by reference to the following specification in connection with the attached drawing in which:

Fig. 1 is a schematic circuit diagram of an illustrative embodiment of a diode test set in accordance with the invention;

Fig. 2 comprises a series of voltage waveforms which illustrate the operation of the circuit of Fig. 1;

Figure 3:
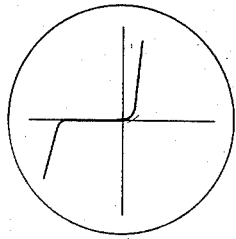
Fig. 3 is a typical oscilloscope trace of the forward and reverse conduction characteristics of a breakdown diode obtained with the circuit of Fig. 1.
Figure 5:
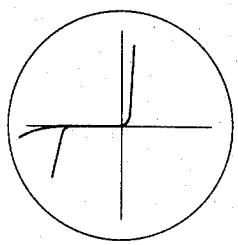
Figure 6:
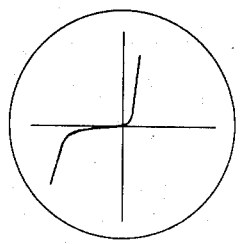
Figure 7:
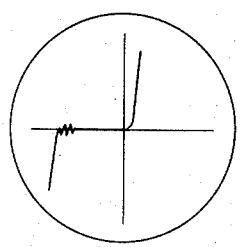
Figure 8:
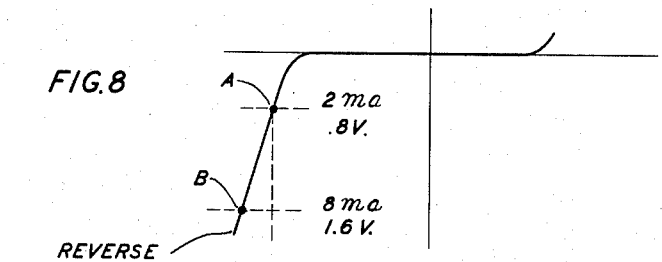

Figs. 5, 6, and 7 are oscilloscope traces illustrating the breakdown diode characteristics of defective diodes; and Fig. 8 is a diode reverse breakdown characteristic, such as that shown in Fig. 3, enlarged to facilitate a description of the method for determining diode reverse dynamic resistance.

Figure 1:
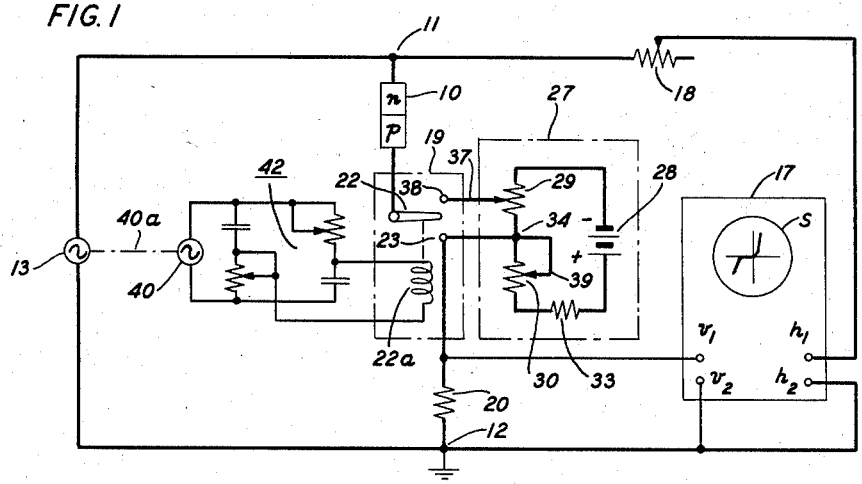

Referring to Fig. 1, breakdown diode 10 under test comprises portions of p-type and n-type semiconductor materials joined together as schematically indicated. When the diode is forward biased into conduction electron current flows internally from the n-type material to the p-type material; and electric current, in the usual convention, is said to flow internally from the p-type material to the n-type material, i. e., opposite to the direction of electron current flow. When diode 10 is hereinafter said to be conducting current, or poled for conduction, or biased in a particular direction, such statements are made with reference to the aforementioned electric current, as distinguished from electron current, convention. For example, if diode 10 is reverse biased, the applied bias tends to drive electric current through diode 10 from the n-type material to the p-type material.

Breakdown diode 10 is connected in a series circuit between output terminals 11 and 12 of an alternating potential generator 13 and poled for forward conduction toward terminal 11. Terminal 12 is connected to ground. Oscilloscope 17 is a well-known type in which an electron beam is developed and projected upon a screen $s$. Electrostatic or electromagnetic forces are applied to the beam to deflect it along various paths and thereby trace upon screen $s$ a desired pattern. The deflecting forces comprise a horizontal component resulting from electric potentials applied to horizontal deflection terminals $h_1$ and $h_2$ and a vertical component resulting from electric potentials applied to vertical deflection terminals $v_1$ and $v_2$.

The output voltage wave of generator 13 may be a symmetrical sine wave having a peak output amplitude between terminals 11 and 12 which is sufficient to bias breakdown diode 10 into conduction in the forward direction but which is not sufficient to bias diode 10 into conduction in the reverse direction. The peak-to-peak amplitude of the output wave of generator 13 is just sufficient to cause the electron beam of the cathode ray oscilloscope 17 to be deflected across the full width of the screen $s$. The output wave of generator 13 is applied to the horizontal deflection terminals $h_1$ and $h_2$ through a rheostat 18 which is connected between terminal 11 and the oscilloscope horizontal deflection terminal $h_1$. The other horizontal deflection terminal $h_2$, as well as a vertical deflection terminal $v_2$, is connected to grounded terminal 12. Potentials derived from terminals 11 and 12 via rheostat 18 cause the electron beam in oscilloscope 17 to be deflected horizontally in a sense and an amount which are functions of the sense and the instantaneous magnitudes of such potentials. Rheostat 18 may be adjusted to obtain the desired oscilloscope horizontal deflection sensitivity.

A switch 19 is connected in series with a current sensing resistor 20 in the aforementioned series circuit including diode 10 between terminals 11 and 12. The p-type portion of diode 10 is connected to the armature 22 of switch 19. Resistor 20 is connected between terminal 12 and contact 23 of switch 19. Contact 23 is also connected to the remaining vertical deflection terminal $v_1$ of oscilloscope 17. Thus the potential derived from resistor 20 and applied to vertical deflection terminals $v_1$ and $v_2$ causes the electron beam in oscilloscope 17 to be deflected vertically in a sense and an amount which are functions of the sense and the instantaneous magnitude of the potentials across resistor 20 which are in turn functions of the instantaneous current flowing in diode 10.

A direct potential source 27 comprises a battery 28, a potentiometer 29, a rheostat 30, and a resistor 33 connected in a series loop circuit. The main resistance portions of potentiometer 29 and rheostat 30 are connected in series with one another, and the common terminal 34 therebetween is connected to the contact 23 of switch 19. An adjustable tap 37 on potentiometer 29 is connected to a contact 38 on switch 19. Thus, with the battery terminal polarity indicated in Fig. 1, contact 38 is negative with respect to associated contact 23. Coarse control of the output voltage magnitude of direct potential source 27 may be exercised by adjusting the tap 37. Adjustable tap 39 on rheostat 30 is connected to the common terminal 34, and vernier control of the output voltage magnitude of direct potential source 27 may be exercised by adjusting the position of tap 39 to regulate the current flowing in potentiometer 29 from battery 28. It will be apparent, however, from the description below of the operation of the circuit of Fig. 1 that the total potential derived from direct potential source 27, and appearing between contacts 23 and 38, must be less than the reverse breakdown voltage of diode 10 by an amount which is equal to or less than the peak amplitude of the variable voltage applied to diode 10 from generator 13.

Armature 22 is alternately and recurrently activated into contacting relation with contacts 23 and 38 by means of an operating coil 22a which is connected to an alternating potential generator 40 via a conventional resistance-capacitance phasing network 42. Generators 13 and 40 are operated in synchronous phase relation with respect to one another as indicated by dash-dot line 40a representing a mechanical connection therebetween. Thus, switch 19 is periodically operable via generator 40 and network 42 in response to potential variations of the output of generator 13 as described below in greater detail.

In some circuit applications of this invention it may be possible to connect a battery directly to contacts 23 and 38 of switch 19. However, it was found that when a mercury type relay was used, as the switch 19, a momentary short circuit occurred between contacts 23 and 38 during each switching operation, thereby placing a heavy drain on battery 28 so intermediate current-limiting resistances were employed.

Figure 2:
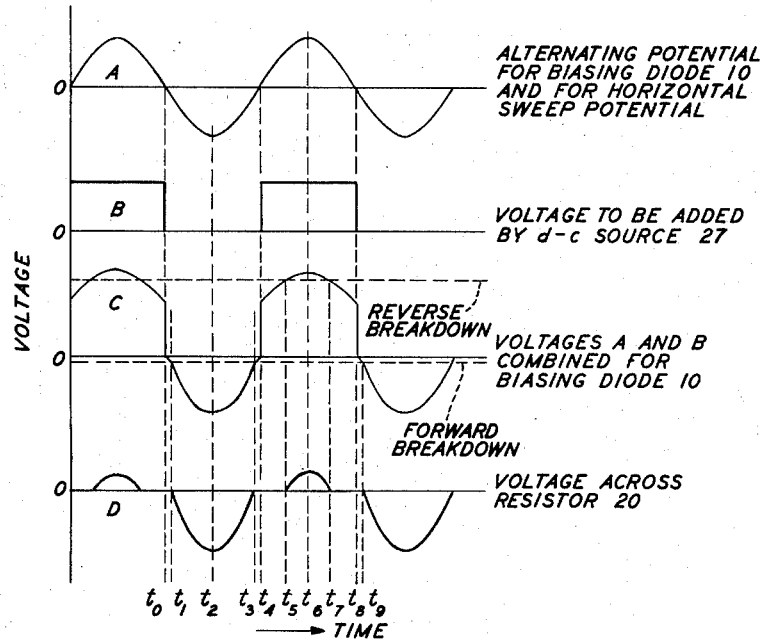
Fig. 2A is a breakdown diode conduction characteristic.
Figure 2A:
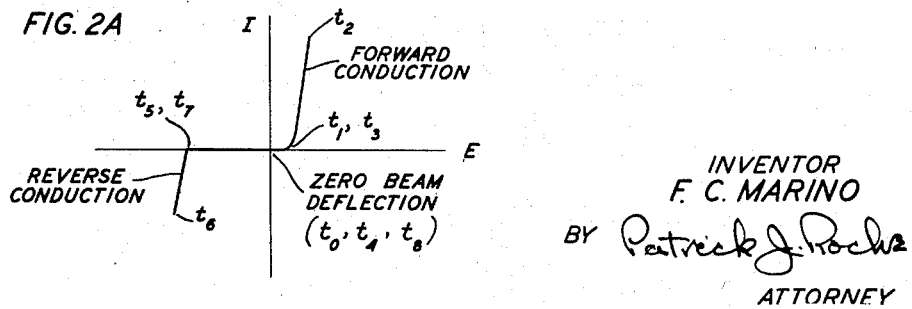

The operation of the circuit of Fig. 1 may best be described in connection with Fig. 2 wherein are illustrated voltage waveforms with respect to time in seconds, and in connection with Fig. 2A wherein is illustrated an oscilloscope trace of the forward and reverse conduction characteristics of a breakdown diode. In Fig. 2 wave A illustrates the cyclically varying voltage output of generator 13 effective at the terminals 11 and 12; wave B illustrates the output voltage of direct potential source 27 as it is intermittently applied between diode 10 and resistor 20 under the control of switch 19; wave C illustrates the total voltage applied across diode 10 by alternating potential source 13 and direct potential source 27; and wave D illustrates the variations in potential difference across current-sensing resistor 20 during the alternate forward and reverse conduction intervals of diode 10 under the influence of wave C. Although wave C represents the total voltage impressed only on diode 10, it should be noted that only the voltage wave A appears between terminals 11 and 12 and between the horizontal deflection terminals $h_1$ and $h_2$ as discussed below in greater detail.

It is initially assumed for the purpose of this description that the operation of the circuit of Fig. 1 commences at a time $t_0$ which corresponds to the beginning of a negative half cycle of the output wave A of generator 13, and the condition of switch 19 is such that armature 22 is in engagement with contact 23 whereby direct potential source 27 is disconnected from diode 10. In this circuit set-up, diode 10 is in a series loop circuit comprising terminal 11, generator 13, grounded terminal 12, current-sensing resistor 20, contact 23, and armature 22. Diode 10 is subjected to increasing forward bias until its forward breakdown voltage, indicated in Fig. 2 by the lower horizontal dashed line on wave C, is exceeded at a time $t_1$. At time $t_1$ current begins to flow through diode 10 in the forward direction, i. e., from the p-type material to the n-type material, and through resistor 20 thereby developing a potential difference across resistor 20 which potential difference is applied to vertical deflection terminals $v_1$ and $v_2$ and causes the electron beam in cathode ray oscilloscope 17 to be deflected upwardly from the voltage axis E as illustrated in Fig. 2A. When the wave A has reached its negative peak at time $t_2$ and begins to decrease toward zero, wave D does the same; and the cathode ray beam is caused to retrace toward its zero vertical deflection position. At time $t_3$ the voltage between terminals 11 and 12 has decreased to the forward breakdown voltage of diode 10 previously identified in wave C of Fig. 2, thereby causing diode 10 to be biased "off." The electron beam of oscilloscope 17 is returned to its zero beam deflection position indicated in Fig. 2A and by wave A in Fig. 2 at time $t_4$.

At the time $t_4$ the alternating potential between terminals 11 and 12 passes through the zero level, increasing in the positive direction. Armature 22 is activated via the voltage of generator 40 and network 42 into engagement with contact 38 in response to the initiation of the positive portion of wave A. Direct potential source 27 is thereby connected in series between the p-type material of diode 10 and resistor 20 in the diode series circuit between terminals 11 and 12, which circuit is part of the aforementioned series loop circuit including generator 13. Diode 10 is now subjected to a reverse bias corresponding to the total potential of the output of direct potential source 27 and the instantaneous positive alternating potential between terminals 11 and 12; but in this circuit condition the horizontal deflection electrodes $h_1$ and $h_2$ of oscilloscope 17 are still subjected to only the alternating potential wave A between terminals 11 and 12. Referring to wave C of Fig. 2 and to Fig. 2A, between the times $t_4$ and $t_5$, diode 10 is "off," and the electron beam of oscilloscope 17 is deflected toward the left from the zero beam deflection point.

At time $t_5$ the total potential applied to diode 10 commences to exceed the reverse breakdown voltage, illustrated by the upper horizontal dashed line on wave C of Fig. 2; and conduction in the reverse direction begins at time $t_5$ as indicated in wave D of Fig. 2. Wave D shows that there is no potential difference across current sensing resistor 20 between the times $t_3$ and $t_5$, but at time $t_5$ a potential difference appears across resistor 20 which causes the electron beam of oscilloscope 17 to be deflected downwardly as indicated in Fig. 2A. Reverse conduction in diode 10 continues to time $t_7$ when the total potential wave C, applied to diode 10 by direct potential source 27, wave B, and by the alternating potential at terminals 11 and 12, wave A, is reduced to the reverse breakdown voltage level as indicated at time $t_7$ in wave C of Fig. 2. Referring to Fig. 2A, between the times $t_5$ and $t_6$ the electron beam of oscilloscope 17 is deflected downwardly reaching the peak of its downward travel at a time $t_6$ and back to the "E" axis at a time $t_7$ along the path illustrated in Fig. 2A. Following time $t_7$ there is no current flowing through current-sensing resistor 20, and there is no potential developed thereacross so the electron beam of oscilloscope 17 is returned by wave A along the "E" axis to the zero beam deflection point at a time $t_8$ as illustrated in Fig. 2A. At time $t_8$ the alternating potential between terminals 11 and 12 goes negative once again, and armature 22 of switch 19 is actuated via the voltage of generator 40 and network 42 into engagement with contact 23 in response to the initiation of the negative portion of wave A. Direct potential source 27 is thus removed from the series connection between terminals 11 and 12. At a time $t_9$ the alternating potential between terminals 11 and 12 once more exceeds the forward breakdown voltage of diode 10; conduction in current-sensing resistor 20 commences again; and the above-recited cycle is repeated.

The duration of the interval between times $t_5$ and $t_7$ can be regulated to display varying amounts of the diode reverse conduction characteristic by adjusting the position of tap 37 on potentiometer 29.

In summary, the alternating potential applied to terminals 11 and 12 by generator 13 tends to bias diode 10 alternately and recurrently for forward conduction ($t_0$ to $t_4$) and reverse conduction ($t_4$ to $t_8$), and the same potential wave is applied to the horizontal deflection electrodes $h_1$ and $h_2$ of oscilloscope 17 to deflect the electron beam back and forth across the screen $s$ thereof. Direct potential source 27 is intermittently switched into a series circuit between terminals 11 and 12 in series-aiding relation with the positive half cycles of the alternating potential between terminals 11 and 12 thereby tending to bias diode 10 for reverse conduction ($t_4$ to $t_8$). The connection of the horizontal deflection terminals $h_1$ and $h_2$ of oscilloscope 17 between terminals 11 and 12 via rheostat 18, without an intervening switching device or cyclic voltage changing means, other than the symmetrical output wave of generator 13, causes the electron beam in oscilloscope 17 to be continuously deflected back and forth across the width of the screen thereof by the potential between terminals 11 and 12. One result of the cyclic application of bias voltages in the above described manner is that during one cycle of wave A ($t_0$ to $t_8$) diode 10 conducts alternately and recurrently in the forward direction ($t_1$ to $t_3$) and in the reverse direction ($t_5$ to $t_7$) with intermediate intervals of nonconduction ($t_0$ to $t_1$, $t_3$ to $t_5$, and $t_7$ to $t_8$). Another result of the cyclic application of bias voltages in the above described manner is that only preselected portions, in the case of the illustrated breakdown diode the portions representing the transitions between the conduction and nonconduction states, of the diode characteristic are displayed, the bulk of the high impedance portion of the diode reverse characteristic being eliminated from the display. Since only preselected portions are displayed, the oscilloscope deflection sensitivity can be expanded to permit minute examination of such preselected characteristic portions. Some of the advantages of such a display become evident upon a consideration of the oscilloscope traces shown in Figs. 3 through 7.

Figure 4:
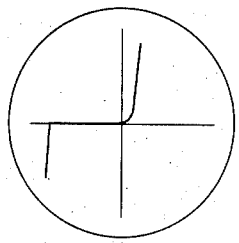
Fig. 4 is a typical oscilloscope trace of the forward and reverse conduction characteristics of a breakdown diode obtained with conventional curve tracing circuits.

There is illustrated in Fig. 3 a typical oscilloscope trace of the forward and reverse current conduction portions of the characteristic of a breakdown diode 10 obtained by means of a circuit such as that illustrated in Fig. 1 and described above. The trace of Fig. 3 was obtained by using for both the forward and reverse conduction portions of the trace an oscilloscope horizontal deflection sensitivity of one volt per inch, and a vertical deflection sensitivity of ten milliamperes per inch. There is illustrated in Fig. 4 a typical oscilloscope trace of the entire current conduction characteristic, including forward and reverse conduction portions, of a breakdown diode obtained by means of a diode curve tracer such as that shown in the aforementioned Blair patent. The deflection sensitivities that were employed to obtain the trace illustrated in Fig. 4 were the same as those employed for the trace of Fig. 3 except that in Fig. 4 the horizontal deflection sensitivity had to be changed from one volt per inch to fifty volts per inch while obtaining the reverse conduction trace in order to keep the trace of the entire characteristic on the oscilloscope screen. The effect of the difference in deflection sensitivity can be seen in the slope of the reverse conduction characteristic. In Fig. 3 the reverse conduction characteristic is shown with a finite slope which is useful in determining the diode reverse dynamic resistance as discussed in greater detail hereinafter. In Fig. 4, on the other hand, the reverse conduction characteristic is shown with an almost infinite slope, which display cannot be put to such a beneficial use but only indicates that the diode is breaking down in the reverse direction.

Figs. 5, 6, and 7 illustrate diode conduction characteristics traced on the oscilloscope screen with the circuit of Fig. 1 and displaying the typical diode breakdown defects mentioned above. It has been found that breakdown diodes displaying characteristics such as those of Figs. 5, 6 and 7 would display characteristics like that of Fig. 4 when observed with deflection sensitivities such as those employed in the case of Fig. 4. In other words, the diode defects which are obvious in the displays of Figs. 5, 6, and 7 would be obscured if the characteristics were displayed with the deflection sensitivities employed for Fig. 4.

In the trace of Fig. 5 the reverse characteristic is forked thereby indicating erratic reverse breakdown. The diode under test was breaking down during some reverse bias intervals producing the lower branch of the fork; and during other reverse bias intervals the diode was maintaining a sufficiently high impedance to prevent breakdown, producing the upper branch of the fork.

Figs. 6 and 7 are typical oscilloscope traces of the characteristics of breakdown diodes which display the defects of curvature and noise, respectively, at the reverse breakdown point. The lack of a distinct reverse breakdown point, as in Figs. 6 and 7, places a severe limitation on the application of such diodes as switches.

In many switching circuits it is convenient to know the resistance of the switch in its closed-circuit condition, i. e., the switch dynamic resistance. It is possible with the circuit of Fig. 1 to determine the reverse dynamic resistance of a breakdown diode by graphic analysis methods similar to those generally employed to determine the dynamic plate resistance of a triode vacuum tube. To accomplish this, however, the circuit resistance must be of approximately the same order of magnitude as the diode reverse dynamic resistance so that the latter resistance will have a detectable effect on the total impedance of the circuit. Accordingly, it is advantageous to arrange the resistance in the direct potential source 27 of Fig. 1 so that a sufficiently high impedance, as seen from the terminals of battery 28, is maintained to prevent an undue drain on battery 28 while at the same time source 27 presents a low impedance (of the same order of magnitude as the diode reverse dynamic resistance) to switch contacts 23 and 38. The arrangement of resistor 33, potentiometer 29, and rheostat 30 connected in series between the terminals of battery 28 is one such arrangement which will be obvious to one familiar with electric circuit art.

Referring to Fig. 8 there is shown an enlarged trace of a diode reverse breakdown characteristic, such as the characteristic illustrated in Fig. 3 obtained by means of the circuit of Fig. 1 in which source 27 presents a relatively low impedance to contacts 23 and 38. Knowing the vertical and horizontal deflection sensitivities of oscilloscope 17 and the zero beam deflection point of the oscilloscope trace, the current and voltage co-ordinates of two points, A and B, on the reverse conduction portion of the characteristic curve are determined. For example, the co-ordinates of point A may be 2 milliamperes and 0.8 volt while the co-ordinates of point B may be 8 milliamperes and 1.6 volts. The slope resistance depicted by the displayed characteristic is then equal to the ratio of the change in voltage to the change in current between the points A and B. The above-recited exemplary co-ordinates yield a slope resistance of 133 ohms as illustrated in Fig. 8.

Next, the resistance added to the series circuit between terminals 11 and 12 and including diode 10, resistor 20, and source 27 must be determined by well-known resistance measuring techniques. For example, the resistance added to the loop circuit by direct potential source 27 may be found to be 75 ohms; and the resistance contributed to the series loop circuit by resistor 20 may be 5 ohms, depending on the current-deflection ratio desired for the display and the vertical deflection sensitivity of the particular oscilloscope employed. Thus the total resistance contributed to the loop circuit by elements other than diode 10 would be 80 ohms. Subtracting the last-mentioned resistance from the slope resistance of the diode reverse conduction characteristics yields a diode reverse dynamic resistance of 53 ohms. It has been found that such a determination of the diode reverse dynamic resistance is not possible with conventional diode curve tracing circuits since the slope of the reverse conduction portion of the characteristic cannot be displayed with sufficient accuracy in relation to the size of the oscilloscope screen while employing the deflection sensitivities required in such circuits to display both the forward and reverse conduction characteristics of the diode.

Although this invention has been described in connection with a particular embodiment thereof, other embodiments which will be obvious to persons skilled in the art are included within the spirit and scope of the invention as set forth in the following claims:

What is claimed is:

1. Means for deflecting the electron beam in a cathode ray oscilloscope to display on the screen thereof predetermined portions of the electric current conduction characteristics of an impedance device, said means comprising a source potential for generating a cyclically repeating output wave of varying amplitude and polarity, switching means, means for actuating said switching means in response to predetermined portions of said output wave, a source of direct potential, means including said switching means for cyclically first connecting said impedance device in a series loop circuit with said variable potential source during a portion of said output wave of one polarity for biasing said device into conduction on a first predetermined portion of its conduction characteristic, said last-mentioned cyclical means then connecting said source of direct potential in series with said impedance device in said series loop circuit during a portion of said output wave of different polarity for biasing said device into conduction on a second predetermined portion of its conduction characteristic, means connected to said loop circuit for deriving therefrom a first signal which is a function of the current in said device, means for applying said first signal to said oscilloscope for deflecting said electron beam in a first direction in a sense and an amount which are functions of the sense and amount of the current conducted by said device, means for deriving from said loop circuit and applying to said oscilloscope a second signal which is a function of said output wave amplitude exclusive of the output of said direct potential source for deflecting said electron beam in a second direction in a sense and an amount which are functions of the sense and magnitude, respectively, of said second signal.

2. A circuit for simultaneously displaying on the screen of a cathode ray oscilloscope the forward and reverse voltage-current conduction characteristic of a semiconductor diode under test, said circuit comprising said oscilloscope including a pair of horizontal deflection terminals and a pair of vertical deflection terminals, a source of alternating voltage of predetermined amplitude connected to said horizontal deflection terminals, a source of direct voltage of predetermined magnitude, resistance means connected to said vertical deflection terminals, switching means, and means including said switching means responsive to one polarity of said alternating voltage to connect said diode and resistance means in series across said alternating source when said diode is biased into forward conduction by said last-mentioned alternating voltage, said switching means being also responsive to the opposite polarity of said alternating voltage to connect said direct potential source in series with said diode and said resistance across said alternating source when said diode is biased into reverse conduction by said last-mentioned alternating voltage, said direct potential source back biasing said diode in said last-mentioned series connection.

3. In electric circuit means for actuating a cathode ray oscilloscope to produce on the screen thereof the forward and reverse conduction characteristics of a semiconductor diode and wherein signals for actuating the horizontal and vertical deflection circuits of said oscilloscope are derived from portions of said circuit means including said diode for application to the horizontal and vertical deflection terminals, respectively, of said oscilloscope and wherein switching means are provided for alternately applying forward and reverse bias potentials across said diode to bias said diode into forward and reverse conduction, respectively, the improvement in means for applying said forward and reverse bias potentials and for deriving signals for application to said horizontal deflection circuit comprising a source of alternating potential having a symmetrical output voltage wave, means for continuously applying said output voltage wave to said horizontal deflection terminals for providing horizontal deflection signals thereto, a series circuit including said switching means and said diode, means for connecting said series circuit to said alternating potential source to form a series loop therewith excluding said horizontal deflection circuit and providing said forward bias potential to said diode, a source of direct potential connected to said switching means, and means for actuating said switching means in response to a predetermined portion of said output voltage wave to connect said source of direct potential in said series circuit in series-aiding relation with said output voltage wave predetermined portion to provide said reverse bias potential.

4. An electric circuit for testing semiconductor diodes which conduct electric current in the forward direction in response to a forward bias voltage and which conduct electric current in the reverse direction in response to a reverse bias voltage of a much larger magnitude than said forward bias voltage, said circuit comprising a source of alternating potential having a symmetrical output voltage wave with a peak amplitude at least as great as said forward bias voltage but less than said reverse bias voltage, a cathode ray oscilloscope including a pair of horizontal deflection terminals and a pair of vertical deflection terminals, means for connecting said alternating potential source to a first pair of said deflection terminals, a source of direct potential having an output voltage magnitude which is less than said reverse bias voltage, a semiconductor diode, and means for connecting said diode between the terminals of said alternating potential source for biasing said diode alternately in the forward and reverse directions, said diode connecting means comprising a resistor connected between a second pair of said deflection terminals and in series with said diode for applying to said second pair of deflection terminals a voltage that is a function of the current in said diode, and switching means for connecting said direct potential source in series with said diode in series-aiding relation with a portion of said alternating potential source output wave tending to apply a reverse bias to said diode.

5. An electric circuit for supplying horizontal sweep and vertical deflection potentials to a cathode ray oscilloscope to display on the screen of said oscilloscope both the forward and reverse conduction characteristics of a semiconductor junction diode, said circuit comprising said oscilloscope including horizontal and vertical deflection terminals, a first source of alternating potential, means for connecting the output of said first source to said horizontal deflection terminals to provide a continuous oscilloscope horizontal sweep potential thereto, said first source generating an output voltage wave having alternate and substantially equal positive and negative voltage portions, a resistor, means for connecting said resistor and said diode in a series circuit between said horizontal deflection terminals, said diode being poled for forward conduction in response to said negative output voltage wave portion, means for connecting said resistor between said vertical deflection terminals for applying to said vertical deflection terminals a potential having a sense and magnitude which are functions of the sense and magnitude of the current in said series circuit including said diode, a source of direct potential, a second source of alternating potential for supplying an output voltage wave in synchronism with the output voltage wave of said first source of alternating potential, switching means connected to said series circuit and said source of direct potential for switching said source of direct potential into and out of connection in said series circuit, a phase shifting network for applying the output of said second source of alternating potential to said switching means to actuate said switching means to connect said source of direct potential into said series circuit in series-aiding relation with at least a portion of said positive output voltage wave portion to reverse bias said diode.

6. An electric circuit for testing the voltage breakdown characteristics of a semiconductor junction diode which conducts in the forward direction when forward biased by a voltage of at least a first predetermined magnitude and conducts in the reverse direction when reverse biased by a voltage of at least a second predetermined magnitude which is larger than said first predetermined magnitude, said electric circuit comprising a cathode ray oscilloscope having a pair of horizontal deflection terminals and a pair of vertical deflection terminals, means for connecting one of said horizontal deflection terminals and one of said vertical deflection terminals to ground, a first source of alternating potential having output terminals for producing at said output terminals a voltage wave having substantially equal positive and negative wave portions, means for continuously applying to said horizontal deflection terminals said output voltage wave only, the peak amplitude of said output voltage wave being at least equal to said first predetermined magnitude but less than said second predetermined magnitude, switching means having two fixed contacts and a movable contact which can be actuated into contacting relation with either of said fixed contacts, means for connecting said diode between a first terminal of said alternating potential source and said movable contact, a resistor, means for connecting said resistor between a first one of said fixed contacts and ground, a connection from said first fixed contact to a second one of said vertical deflection terminals, a source of direct potential having an output potential of a magnitude which is less than said second predetermined voltage by an amount which is equal to or less than said alternating potential peak amplitude, said source of direct potential comprising a battery having positive and negative terminals, a potentiometer and a rheostat each having at least two fixed terminals and at least one movable terminal, means for connecting one fixed terminal on said potentiometer to said negative terminal, means for connecting the other fixed terminal on said potentiometer to one fixed terminal on said rheostat, and to said first fixed contact, means for connecting the other fixed terminal on said rheostat to said positive terminal, means for connecting a second one of said fixed contacts to said potentiometer movable terminal whereby coarse control of the output voltage of said direct potential source between said first and second fixed contacts may be exercised by moving said potentiometer movable terminal, and means for connecting said rheostat first and movable terminals together whereby vernier control of the output voltage of said direct potential source between said first and second fixed contacts may be exercised by moving said rheostat movable terminal, a second source of alternating potential for generating an output voltage wave in synchronism with said first alternating potential source output wave, and phase shifting means for applying said second alternating potential source output wave to said switching means to actuate said movable contact into contacting relation with said first fixed contact during said negative portions of said output wave of said first alternating potential source to forward bias said diode and into contacting relation with said second fixed contact during said positive portions of said first alternating potential source output wave for connecting said direct potential source in series-aiding relation with said positive portions to reverse bias said diode.

7. Apparatus for displaying on the screen of a cathode ray oscilloscope a unitary trace representing substantially simultaneously both the forward and reverse current-voltage conduction characteristics of a two-pole semiconductor junction diode requiring different magnitudes of biasing voltage for effecting the respective characteristics, comprising a source of alternating voltage for biasing said diode and at the same time activating the trace on said screen in one direction, a supply of direct current voltage, a fixed resistor for providing a voltage to activate the trace on said screen in a direction different from said one direction, switching means, and means for operating said switching means in two different respects in synchronism with the biasing voltage of said source, said operating means operating said switching means in a first of said two respects in response to biasing voltage of one polarity to connect said biasing source in circuit with said diode and resistor for applying said last-mentioned biasing voltage to said diode with one predetermined magnitude whereby said screen is provided with a trace representing said forward conduction characteristic, said operating means operating said switching means in a second of said two respects in response to biasing voltage of a different polarity to connect said biasing source in circuit with said diode, resistor and direct-current supply for applying to said diode a biasing voltage having said different polarity and having a magnitude comprising the combined voltages of said source and supply whereby said screen is provided with a trace representing said reverse conduction characteristic.

8. The apparatus according to claim 7 which includes a variable resistor connected in circuit with said source to control the magnitude of the voltage for activating the trace in said one direction and thereby adjusting the oscilloscope sensitivity in said last-mentioned direction.

9. The apparatus according to claim 7 in which said direct current voltage supply includes a direct current battery, a potentiometer, a rheostat and a further fixed resistor connected in a series circuit, a movable contact on said potentiometer constitutes one output terminal, and a common terminal between said potentiometer and rheostat constitutes a second ouput terminal which is fixedly connected to one end of said first-mentioned resistor, said operating means operating said switching means in said first respect to connect said one end of said first-mentioned resistor to said diode, said operating means operating said switching means in said second respect to connect said last-mentioned first output terminal to said diode.

10. The apparatus according to claim 7 in which said operating means includes a variable resistance-capacitance network for adjusting the operation of said switching means in each of said two respects thereby enabling the operating of said switching means in such two respects substantially in synchronism with the voltage of said source.

No references cited.